(12) United States Patent
Yang et al.

(10) Patent No.: US 11,606,831 B2
(45) Date of Patent: Mar. 14, 2023

(54) RADIO LINK RECOVERY METHOD AND TERMINAL

(71) Applicant: VIVO MOBILE COMMUNICATION CO., LTD., Guangdong (CN)

(72) Inventors: Xiaodong Yang, Chang'an Dongguan (CN); Ran Yue, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 160 days.

(21) Appl. No.: 16/959,782

(22) PCT Filed: Jan. 2, 2019

(86) PCT No.: PCT/CN2019/070069
§ 371 (c)(1),
(2) Date: Jul. 2, 2020

(87) PCT Pub. No.: WO2019/134642
PCT Pub. Date: Jul. 11, 2019

(65) Prior Publication Data
US 2020/0367309 A1    Nov. 19, 2020

(30) Foreign Application Priority Data
Jan. 4, 2018 (CN) .......... 201810009127.8

(51) Int. Cl.
*H04W 76/19* (2018.01)
*H04W 76/15* (2018.01)
(Continued)

(52) U.S. Cl.
CPC .......... *H04W 76/19* (2018.02); *H04L 5/0092* (2013.01); *H04W 36/0033* (2013.01);
(Continued)

(58) Field of Classification Search
CPC ............... H04W 76/19; H04W 76/15; H04W 36/0079; H04W 36/0033; H04W 80/02;
(Continued)

(56) References Cited

U.S. PATENT DOCUMENTS

2015/0133122 A1    5/2015  Chen
2016/0057802 A1    2/2016  Lee et al.
(Continued)

FOREIGN PATENT DOCUMENTS

CN    101500279 A    8/2009
CN    101873655 A    10/2010
(Continued)

OTHER PUBLICATIONS

PCT International Search Report and Written Opinion issued in corresponding application No. PCT/CN2019/070069, dated Jul. 16, 2020.
(Continued)

*Primary Examiner* — Mandish K Randhawa
(74) *Attorney, Agent, or Firm* — Maschoff Brennan

(57) ABSTRACT

A radio link recovery method and a terminal are provided. The method includes: recovering a radio link where a radio link failure or a handover failure occurs, according to radio link configuration information before the radio link failure or the handover failure. The radio link configuration information includes at least one piece of following information: configuration information of carrier aggregation (CA), configuration information of dual connectivity (DC), or configuration information of bandwidth part (BWP).

19 Claims, 2 Drawing Sheets

(51) Int. Cl.
*H04W 36/00* (2009.01)
*H04L 5/00* (2006.01)
*H04W 80/02* (2009.01)
*H04W 80/08* (2009.01)
*H04W 84/18* (2009.01)

(52) U.S. Cl.
CPC ....... *H04W 36/0079* (2018.08); *H04W 76/15* (2018.02); *H04W 80/02* (2013.01); *H04W 80/08* (2013.01); *H04W 84/18* (2013.01)

(58) Field of Classification Search
CPC .... H04W 80/08; H04W 84/18; H04L 5/0092; H04L 5/001; H04L 5/0098
See application file for complete search history.

(56) References Cited

U.S. PATENT DOCUMENTS

| | | | | |
|---|---|---|---|---|
| 2017/0019945 A1* | 1/2017 | Chiba | ................... | H04W 76/19 |
| 2017/0070985 A1* | 3/2017 | Uchino | ............. | H04W 72/0406 |
| 2018/0098261 A1* | 4/2018 | Wang | ................... | H04W 36/34 |

FOREIGN PATENT DOCUMENTS

| | | |
|---|---|---|
| CN | 102104982 A | 6/2011 |
| CN | 105103593 A | 11/2015 |

OTHER PUBLICATIONS

Huawei, Hisilicon, RLF for NR, 3GPP TSG-RAN WG2-NR Adhoc#2, Qingdao, China, Jun. 27-29, 2017, R2-1706745.

* cited by examiner recovering a radio link where a radio link failure or a handover failure occurs, according to radio link configuration information before the radio link failure or the handover failure occurs — 11

RADIO LINK RECOVERY METHOD AND TERMINAL

CROSS-REFERENCE TO RELATED APPLICATION

This application is the U.S. national phase of PCT Application No. PCT/CN2019/070069 filed on Jan. 2, 2019, which claims a priority to Chinese Patent Application No. 201810009127.8 filed on Jan. 4, 2018, the both disclosures of which are incorporated in their entireties by reference herein.

TECHNICAL FIELD

The present disclosure relates to the technical field of communications, and in particular to a radio link recovery method and a terminal.

BACKGROUND

Carrier aggregation (CA) technology is introduced in $4^{th}$ Generation (4G) mobile communication system, which is also referred to as Long Time Evolution (LTE) system. The carrier aggregation technology means that a terminal, which is also referred to as User Equipment (UE), connects and communicates with a network over multiple cells, where one of the multiple cells serves as a Primary Cell (PCell) of the terminal, and the other cells of the multiple cells serve as a Secondary Cell (SCell) of the terminal. SCell has an activated state and a deactivated state, and PCell maintains an activated state all the time, and has no deactivated state. When a network device adds one or more SCells by using a Radio Resource Control (RRC) Connection Reconfiguration message, initial states of the added one or more SCells are deactivated states. Similarly, in a handover scenario, a target network device may transmit configuration information of SCell to a source network device via a handover command, and the target network device forwards the configuration information to the terminal by using an RRC connection reconfiguration message, where initial states of all the SCells are deactivated states.

The terminal maintains a SCell deactivation timer for each SCell. When a SCell enters the activated state, the terminal starts a corresponding SCell deactivation timer. If the terminal does not receive data or a physical downlink control channel (PDCCH) message on the corresponding SCell after the SCell deactivation timer expires, the terminal automatically deactivates the SCell. At present, an activation/deactivation mechanism of SCell is based on a combination of control element (CE) of media access control (MAC) and a deactivation timer.

A delay of switching from a deactivated state to an activated state is long. In order to reduce the delay, a new state (new fast SCell activation state or SCell new state) is introduced in $5^{th}$ Generation (5G) mobile communication system, which is also referred to as New Radio (NR) system. The new state is between the activated state and the deactivated state. In the new state, it is allowed that periodic channel quality indicator (CQI) reporting is performed based on a cell reference signal (CRS) without PDCCH monitoring, which is not limited to the CQI reporting, and some activated state behaviors are allowed, for example, transmitting a sounding reference signal (SRS) or receiving a physical downlink shared channel (PDSCH).

Presently, LTE system and 5G system need to be tightly coupled in a dual connectivity (DC) mode, where one system acts as a master node (MN), and the other system acts as secondary node (SN). In a dual-connectivity system, there are two cell groups: master cell group (MCG) and secondary cell group (SCG). The MCG includes one PCell and one or more SCells; and the SCG includes a primary secondary cell (PSCell) and one or more SCells.

Both LTE system and NR system have a radio link monitor (RLM) function. In the RLM function of the LTE system, a terminal monitors a radio link by measuring a signal to interference plus noise ratio (SINR) of part CRS of the PDCCH. In a case that the measured part CRS of the PDCCH is lower than a certain threshold, it is determined that the radio link is out of synchronization (out-of-sync), the physical layer notifies a higher layer (such as the RRC layer) of an out-of-sync indication, and if the RRC layer has received N consecutive out-of-sync indications, the terminal starts a timer T1. In a case that the measured part CRS of the PDCCH is higher than a certain threshold, it is determined that the radio link is in synchronization (in-sync), the physical layer notifies the RRC layer of an in-sync indication, and if the RRC layer has continuously received M in-sync indications, the terminal stops the timing of the timer T1. If the timer T1 expires, the terminal determines a radio link failure (RLF) occurring to the radio link. The numbers of out-of-sync indications and in-sync indications for counting is configured by a network device side. Further, in addition to triggering the RLF when timer T1 expires, RLF may be triggered when the number of radio link control (RLC) layer data transmissions of the terminal reaches the maximum number, or the number of random access channels (RACHs) reaches the maximum number. Similarly, when the timer expires during handover, the terminal may also trigger a hand over failure (HOF).

In CA scenarios or DC scenarios, the terminal may perform reestablishment under RLF or HOF. If the reestablishment succeeds, the terminal may recover to the RRC_connected state, but the terminal can only recover to a single carrier state. If the terminal wants to apply the CA or DC state, the terminal needs to perform CA or DC reconfiguration. Therefore, the terminal cannot quickly enter the CA or DC state when the terminal recovers to the RRC connected state after RLF or HOF occurs.

SUMMARY

In a first aspect, embodiments of the present disclosure provide a radio link recovery method, which includes: recovering a radio link where a radio link failure or a handover failure occurs, according to radio link configuration information before the radio link failure or the handover failure. The radio link configuration information includes at least one piece of following information: configuration information of carrier aggregation (CA), configuration information of dual connectivity (DC), or configuration information of bandwidth part (BWP).

In a second aspect, embodiments of the present disclosure further provide a terminal, including: a first recovery module, configured to recover a radio link where a radio link failure or a handover failure occurs, according to radio link configuration information before the radio link failure or the handover failure, where the radio link configuration information includes at least one piece of following information: configuration information of carrier aggregation (CA), configuration information of dual connectivity (DC), or configuration information of bandwidth part (BWP).

In a third aspect, embodiments of the present disclosure provide a terminal, including a processor, a memory, and a program stored in the memory and executable on the processor. The processor is configured to, when executing the program, implement steps of the foregoing radio link recovery method.

In a fourth aspect, embodiments of the present disclosure provide a computer-readable storage medium, where a program is stored on the computer-readable storage medium, and the program is executed by a processor to implement steps of the foregoing radio link recovery method.

BRIEF DESCRIPTION OF THE DRAWINGS

In order to describe technical solutions of embodiments of the present disclosure more clearly, drawings used in the description of the embodiments of the present disclosure are briefly described hereinafter. Apparently, the drawings in the following description are merely some of the embodiments of the present disclosure, and those of ordinary skill in the art may obtain other drawings based on these drawings without creative effort.

DETAILED DESCRIPTION

Figures 1, 2:
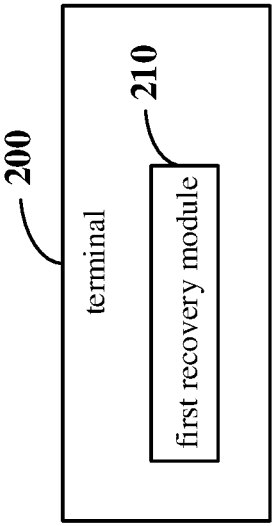
FIG. 1 is a schematic flowchart of a radio link recovery method according to embodiments of the present disclosure.
FIG. 2 shows a schematic diagram of a module structure of a terminal according to embodiments of the present disclosure.

Exemplary embodiments of the present disclosure will be described in more detail below with reference to the accompanying drawings. Although exemplary embodiments of the present disclosure are shown in the drawings, it should be understood that the present disclosure may be implemented in various forms and should not be limited by the embodiments set forth herein. Conversely, these embodiments are provided in order to enable a more thorough understanding of the present disclosure and to fully convey the scope of the present disclosure to those of ordinary skill in the art.

Such terms as "first", "second", and the like in the specification and claims of this application are used to distinguish similar objects without having to describe a particular order or sequence. It should be understood that the data used in this manner may be interchangeable where appropriate so that the embodiments of the present application described herein can be implemented, for example, in a sequence other than those illustrated or described herein. Furthermore, such terms as "including" and "having" and any variant thereof are intended to cover non-exclusive inclusion, for example, processes, methods, systems, products or devices that include a series of steps or units are not necessarily limited to those clearly listed but may include other steps or units that are not clearly listed or inherent to these processes, methods, products or devices.

A radio link recovery method and a terminal are provided according to embodiments of the present disclosure, so as to solve problems of complex configurations and long recovery delay in a process of radio link recovery of the terminal in the related art.

The embodiments of the present disclosure provide a radio link recovery method, which is applied to a terminal. As shown in FIG. 1, the method specifically includes step 11, recovering a radio link where a radio link failure or a handover failure occurs, according to radio link configuration information before the radio link failure or the handover failure occurs.

The radio link configuration information includes at least one piece of the following information: configuration information of carrier aggregation (CA), configuration information of dual connectivity (DC), or configuration information of bandwidth part (BWP). In this way, in a case that a radio link fails or a handover fails, when recovering the radio link, the terminal may configure the recovered radio link by using the configuration information of CA, the configuration information of DC, and/or the configuration information of BWP before RLF or HOF occurs, so as to save the configuration time during which the radio link is recovered, and to shorten the recovery delay. It should be noted that the configuration information of CA or DC is only for illustrative description in the embodiments of the present disclosure, and the configuration information of BWP may also be implemented in the same manner. For the configuration of BWP in process of radio link recovery, reference may be made to the configuration of CA or DC. That is, a BWP in process of radio link recovery may be configured by replacing the configuration information of CA or DC in the embodiments of the present disclosure with the configuration information of the BWP.

Further, prior to step 11, the radio link recovery method further includes: obtaining access stratum (AS) context information before the radio link failure or the handover failure, when the radio link failure or the handover failure occurs; and determining, according to the AS context information, the radio link configuration information before the radio link failure or the handover failure. All or part of the AS context information of the radio link is maintained on the terminal side, and the AS context information may be used to indicate the radio link configuration information before the radio link failure or the handover failure. That is, when a radio link failure or a handover failure occurs on the terminal, the terminal initiates a radio link recovery procedure, obtains AS context information maintained on the terminal side before the radio link failure or the handover failure, and determines the radio link configuration information according to the AS context information. In a case that the radio link of the terminal is reestablished successfully, the reestablished radio link is configured directly with the determined radio link configuration information, so as to save the configuration time of the radio link recovery and shorten the recovery delay.

Further, the radio link configuration information further includes at least one piece information selected from the following information: configuration information of a physical layer, configuration information of a media access control (MAC) layer, configuration information of a radio link control (RLC) layer, configuration information of a packet data convergence protocol (PDCP) layer, or configuration information of a service data adaptation protocol (SDAP) layer. Optionally, after RLF or HOF occurs to a terminal, a radio link reestablishment process is triggered. Since all or part of the AS context information of the terminal is stored at the terminal side, the terminal directly recovers the use of the AS context information after the radio link reestablishment succeeds, so as to determine all the configuration information in CA or DC. Optionally, the terminal may also recover only configurations of part layers in the CA or DC: the configuration information of the physical layer, the configuration information of the MAC layer, the configuration information of the RLC layer, the configuration information of the PDCP layer, or the configuration information of the SDAP layer. For example, only the configuration information of the RLC layer, the configuration information of the PDCP layer, and the configuration information of the SDAP layer are recovered, and the configuration information of the physical layer and the configuration information of the MAC layer are set as default configuration. Optionally, the terminal only recovers configurations of part parameters of each protocol layer, for example, a serial number (SN) in the configuration information of the PDCP layer is reset to 0, but a header compression state algorithm of the PDCP layer is maintained.

Further, the radio link configuration information further includes configuration information of a primary cell (PCell) in the CA or the DC and configuration information of a secondary cell (SCell) in the CA or the DC. The configuration information of the PCell at least includes identity information of the PCell. The configuration information of the SCell at least includes the number of SCell(s), identity information of each SCell, and state information of each SCell. The state information of each SCell includes an activated state, a deactivated state, and a new state. The new state is a state between the activated state and the deactivated state, which allows periodic CQI reporting based on CRS, and allows not to monitor to PDCCH. It is worth noting that the new state is not limited to the CQI reporting, and may also include some activated state behaviors such as transmitting SRS or receiving PDSCH.

Specifically, step 11 includes: determining, according to the configuration information of the PCell in the CA or the DC, the PCell of the radio link where the radio link failure or the handover failure occurs; determining, according to the configuration information of the SCell(s) in the CA or the DC, the SCell(s) of the radio link where the radio link failure or the handover failure occurs and state information of each SCell; and recovering the radio link according to the PCell and the SCell(s) of the radio link, and the state information of each SCell. After RLF or HOF occurs, the terminal triggers a radio link reestablishment process. Since all or part of the AS context information of the terminal remains at the terminal side, the terminal directly recovers the use of AS context information after the radio link reestablishment succeeds, and determines the configuration information of the PCell and the configuration information of the SCell(s) in the CA or DC before RLF or HOF. Further, the terminal determines the identity information of the PCell according to the configuration information of the PCell in the CA or DC; determines the number of the SCell(s), the identity information of each SCell and the state information of each SCell according to the configuration information of the SCell(s) in the CA or DC; and then configures the successfully reestablished radio link according to the configuration information of the PCell and the configuration information of the SCell(s), thereby saving the configuration time for radio link recovery and shortening the recovery delay.

For example, before the RLF, a terminal is configured with CA of one Pcell and four Scells; and when a radio link is reestablished successfully for the terminal, the terminal recovers CA configurations of one Pcell and four Scells.

Further, a step of recovering the radio link according to the PCell and the SCell(s) of the radio link, and the state information of each SCell includes: recovering the PCell of the radio link according to the PCell of the radio link; and according to the SCell(s) and the state information of each SCell, recovering each SCell of the radio link to a state before the radio link failure or the handover failure, or recovering each SCell of the radio link to a predetermined state, or recovering a SCell of the radio link that is in an activated state.

That is to say, since the number of PScell is one and the PScell is in an activated state, the terminal can configure the successfully reestablished radio link directly according to the configuration information of the determined PCell. Since both the state of the SCell(s) and the number of the SCell(s) are uncertain, the terminal may have different processing and recovery strategies for SCell configuration.

In some optional embodiments, the terminal may recover each SCell of the radio link to the state before the radio link fails or the handover fails according to the SCell(s) of the radio link and the state information of each SCell. It is assumed that the terminal is configured with four SCells before the RLF or HOF occurs, where two of the four Scells are in an activated state, one of the four SCells is in a new state, and the last one of the four SCells is in a deactivated state. The terminal may configure the successfully reestablished radio link directly according to the configuration information of the four SCells.

In other optional embodiments, the terminal may recover each SCell of the radio link to a predetermined state according to the SCell(s) of the radio link and the state information of each SCell. It is assumed that the terminal is configured with four SCells before the RLF or HOF occurs, and the terminal may configure the four SCells for the successfully reestablished radio link. However, the terminal no longer cares about states of the four SCells before the RLF or HOF occurs, but directly recovers the four SCells to a predetermined state, for example, a deactivated state.

In other optional embodiments, the terminal may recover a SCell of the radio link that is in an activated state according to the SCell(s) of the radio link and the state information of each SCell. It is assumed that the terminal is configured with four SCells before the RLF or HOF occurs, where two of the four Scells are in an activated state, one of the four SCells is in a new state, and the last one of the four SCells is in a deactivated state. The terminal may configure the successfully reestablished radio link according to the configuration information of the two SCells in in an activated state, and does not recover SCells in other states.

Further, after the RLF or HOF occurs, the terminal may reestablish a radio link in another cell, and configurations of the other cell may be different from configurations supported by a serving cell of the terminal on which the RLF or HOF occurs. For example, the serving cell before the RLF or HOF occurs may have three aggregated carriers, while the reestablished cell after the RLF or HOF only supports two aggregated carriers. Therefore, in the radio link recovery method according to embodiments of the present disclosure, it may be further determined, based on a preset condition, whether CA or DC configuration or single carrier configuration is recovered for the terminal.

Specifically, prior to step 11, the method further includes: in a case that a current cell to which a current location belongs is a cell in a predetermined cell set, performing the step of recovering the radio link where the radio link failure or the handover failure occurs, according to the radio link configuration information before the radio link failure or the handover failure; or otherwise, recovering the radio link where the radio link failure or the handover failure occurs to a single carrier configuration. The numbers of carrier aggregations supported by respective cells that belong to the same predetermined cell set are the same. Specifically, a network device may configure a predetermined cell set for the terminal, or the terminal maintains a default predetermined cell set, where the predetermined cell set includes multiple cells. In a case that the terminal reestablishes a radio link in a cell in the predetermined cell set after RLF or HOF occurs, the terminal configures the successfully reestablished radio link according to the configuration information of the CA or DC before RLF or HOF. In a case that the terminal reestablishes a radio link in a cell that does not belong the predetermined cell set after RLF or HOF, the terminal configures the successfully reestablished radio link as a single carrier.

Optionally, prior to step 11, the method includes: receiving system information broadcasted by a current cell to which a current location belongs; and detecting, according to the system information, whether a configuration of the current cell is consistent with at least part of configurations supported by a serving cell to which a terminal before the RLF or HOF belongs. That is, the terminal determines strategies for configuring the successfully reestablished radio link, based on whether the configuration of the current cell is consistent with at least part of configurations supported by the serving cell to which a terminal before the RLF or HOF belongs, which is broadcasted by a network device. Specifically, when it is detected that the configuration of the current cell is consistent with part of the configurations supported by the serving cell to which the terminal before the RLF or HOF belongs, the radio link where the RLF or HOF occurs is recovered according to the consistent part of the configurations in the radio link configuration information. When it is detected that the configuration of the current cell is consistent with all the configurations supported by the serving cell to which the terminal before the RLF or HOF belongs, the radio link where the RLF or HOF occurs is recovered according to all the configurations in the radio link configuration information. The terminal receives the system information broadcasted by the network device to determine the number of carriers supported by the current cell. In a case that the system information indicates that the current cell supports aggregation of several carriers, the terminal further determines whether the number and frequencies of carriers supported by the current cell are consistent with the number and frequencies of carriers supported by the serving cell of the terminal before RLF or HOF occurs. If they are completely consistent, the terminal performs CA or DC configuration on the successfully reestablished radio link according to all the CA or DC configuration information; if they are partially consistent, the terminal performs CA or DC configuration on the successfully reestablished radio link according to the consistent part in the CA or DC configuration information; if they are completely inconsistent, the terminal directly configures the successfully reestablished radio link as a single carrier, or initiates a reconfiguration procedure to perform CA or DC configuration.

In the radio link recovery method according to the embodiments of the present disclosure, when recovering a radio link to which RLF or HOF occurs, a terminal uses radio link configuration information before the RLF or HOF occurs to perform configurations for link recovery, without having to perform a reconfiguration procedure after link recovery, which simplifies configuration procedures of the radio link recovery, and shortens the recovery delay, thereby achieving the fast recovery of the radio link after RLF or HOF occurs.

The radio link recovery method in different scenarios are respectively described in detail in the foregoing embodiments. A terminal corresponding to the method will be further described in following embodiments with reference to the accompanying drawings.

As shown in FIG. 2, a terminal 200 is provided according to embodiments of the present disclosure, which can implement details in the above embodiment about a method for recovering a radio link to which RLF or HOF occurs, in accordance with radio link configuration information before RLF or HOF occurs, and achieve the same effects. The radio link configuration information includes at least one piece of the following information: configuration information of carrier aggregation (CA), configuration information of dual connectivity (DC), or configuration information of bandwidth part (BWP). The terminal 200 specifically includes the following functional modules:

a first recovery module 210, configured to recover a radio link where a radio link failure or a handover failure occurs, according to radio link configuration information before the radio link failure or the handover failure, where the radio link configuration information includes at least one piece of following information: configuration information of CA, configuration information of DC, or configuration information of BWP.

The terminal 200 further includes:

an obtaining module, configured to obtain access stratum (AS) context information before the radio link failure or the handover failure, when the radio link failure or the handover failure occurs; and a determination module, configured to determine, according to the AS context information, the radio link configuration information before the radio link failure or the handover failure.

The radio link configuration information includes configuration information of a primary cell (PCell) in the CA or the DC and configuration information of a secondary cell (SCell) in the CA or the DC.

The first recovery module 210 includes:

a first determination sub-module, configured to determine, according to the configuration information of the PCell in the CA or the DC, the PCell of the radio link where the radio link failure or the handover failure occurs;

a second determination sub-module, configured to determine, according to the configuration information of the SCell in the CA or the DC, the SCell of the radio link where the radio link failure or the handover failure occurs and state information of each SCell; and a first recovery sub-module, configured to recover the radio link according to the PCell and the SCell of the radio link, and the state information of each SCell.

The first recovery sub-module includes:

a first recovery unit, configured to recover the PCell of the radio link according to the PCell of the radio link; and a second recovery unit, configured to, according to the SCell of the radio link and the state information of each SCell, recover each SCell of the radio link to a state before the radio link failure or the handover failure, or recover each SCell of the radio link to a predetermined state, or recover a SCell of the radio link that is in an activated state.

The radio link configuration information further includes at least one piece of following information: configuration information of a physical layer, configuration information of a media access control (MAC) layer, configuration information of a radio link control (RLC) layer, configuration information of a packet data convergence protocol (PDCP) layer, or configuration information of a service data adaptation protocol (SDAP) layer.

The terminal 200 further includes:

a second recovery module, configured to perform the step of recovering the radio link where the radio link failure or the handover failure occurs, according to the radio link configuration information before the radio link failure or the handover failure, in a case that a current cell to which a current location belongs is a cell in a predetermined cell set; and a third recovery module, configured to recover the radio link where the radio link failure or the handover failure occurs to a single carrier configuration, in a case that the current cell does not belong to the predetermined cell set.

The terminal 200 further includes:

a reception module, configured to receive system information broadcasted by a current cell to which a current location belongs; and a detection module, configured to detect, according to the system information, whether a configuration of the current cell is consistent with at least part of configurations supported by a serving cell to which a terminal before the radio link failure or the handover failure belongs.

The first recovery module 210 further includes:

a second recovery sub-module, configured to: when it is detected that the configuration of the current cell is consistent with part of configurations supported by the serving cell to which the terminal before the radio link failure or the handover failure belongs, recover the radio link where the radio link failure or the handover failure occurs, according to the consistent part of configurations in the radio link configuration information; and a third recovery sub-module, configured to: when it is detected that the configuration of the current cell is consistent with all the configurations supported by the serving cell to which the terminal before the radio link failure or the handover failure belongs, recover the radio link where the radio link failure or the handover failure occurs, according to all the configurations in the radio link configuration information.

It is worth noting that the terminal according to the embodiments of the present disclosure uses radio link configuration information before the RLF or HOF occurs to perform configurations for link recovery, when recovering a radio link to which RLF or HOF occurs, without having to perform a reconfiguration procedure after the link recovery, which simplifies configuration procedures of the radio link recovery, and shortens the recovery delay, thereby achieving the fast recovery of the radio link after RLF or HOF occurs.

It should be noted that division of the above modules is only a logical division, which may be integrated into a physical entity or physically separated from each other in practice. All these modules may be implemented in the form of a processing element invoking software, or in the form of hardware; or some modules may be implemented in the form of a processing element invoking software, while some other modules may be implemented in the form of hardware. For example, the determination module may be a separately arranged processing element, or may be integrated into a chip of the above devices, or may be stored in a memory of the above devices in the form of program code, where functions of the determination module are invoked and executed by a processing element of the above devices, and implementations of other modules are similar to these. In addition, all or part of these modules can be integrated together or implemented independently. The processing element described herein may be an integrated circuit with signal processing capability. During implementations, the above-mentioned steps or the above-mentioned modules may be completed by the integrated logic circuit in the form of hardware in the processing element or by instructions in the form of software.

For example, the above modules may be one or more integrated circuits configured to implement the above methods, such as one or more Application Specific Integrated Circuits (ASICs), one or more Digital Signal Processors (DSPs), one or more Field Programmable Gate Arrays (FPGAs). For another example, when one of the above modules is implemented in the form of a processing element scheduling codes, the processing element may be a general purpose processor, such as a central processing unit (CPU) or another processor that can call program codes. For another example, these modules may be integrated together in the form of System-On-a-Chip (SOC).

Figure 3:
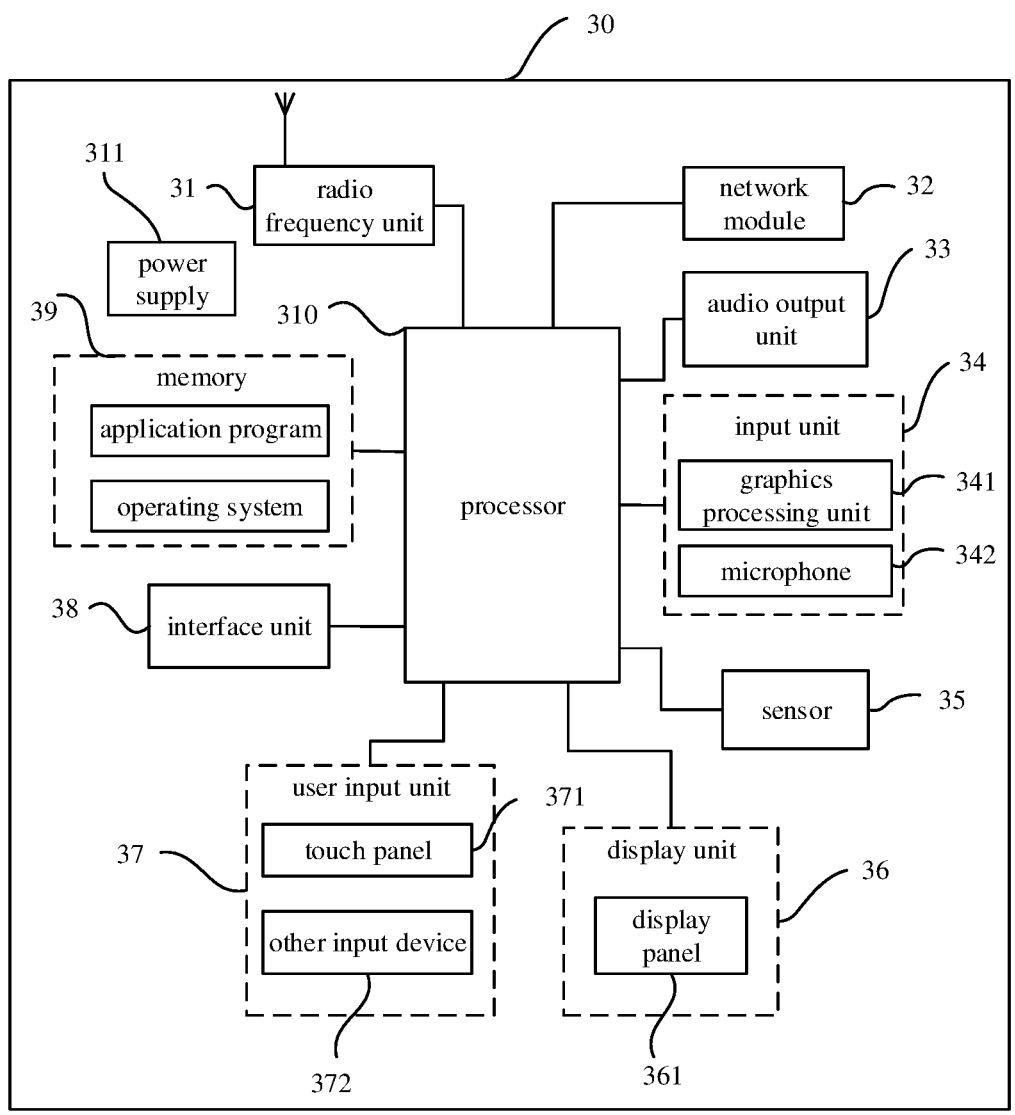
FIG. 3 shows a block diagram of a terminal according to embodiments of the present disclosure.

In order to better achieve the forgoing objectives, FIG. 3 is a schematic diagram of a hardware structure of a terminal used to implement various embodiments of the present disclosure. The terminal 30 includes, but not limited to, a radio frequency unit 31, a network module 32, an audio output unit 33, an input unit 34, a sensor 35, a display unit 36, a user input unit 37, an interface unit 38, a memory 39, a processor 310, and a power supply 311, etc. Those of ordinary skill in the art can understand that the structure of the terminal shown in FIG. 3 does not constitute a limitation to the terminal, and the terminal may include more or fewer components than those shown in the figure, or have some components combined, or use a different arrangement of the components. In the embodiments of the present disclosure, the terminal includes, but not limited to, a mobile phone, a tablet computer, a notebook computer, a palmtop computer, a vehicle-mounted terminal, a wearable device, a pedometer, or the like.

The radio frequency unit 31 is configured to receive and transmit data under the control of the processor 310.

The processor 310 is configured to recover a radio link where a radio link failure or a handover failure occurs, according to radio link configuration information before the radio link failure or the handover failure, where the radio link configuration information includes at least one piece of following information: configuration information of carrier aggregation (CA), configuration information of dual connectivity (DC), or configuration information of bandwidth part (BWP).

The processor 310 is configured to obtain access stratum (AS) context information before the radio link failure or the handover failure, when the radio link failure or the handover failure occurs; and determine, according to the AS context information, the radio link configuration information before the radio link failure or the handover failure.

The radio link configuration information includes configuration information of a primary cell (PCell) in the CA or the DC and configuration information of a secondary cell (SCell) in the CA or the DC.

The processor 310 is configured to determine, according to the configuration information of the PCell in the CA or the DC, the PCell of the radio link where the radio link failure or the handover failure occurs; determine, according to the configuration information of the SCell in the CA or the DC, the SCell of the radio link where the radio link failure or the handover failure occurs and state information of each SCell; and recover the radio link according to the PCell and the SCell of the radio link, and the state information of each SCell.

The processor 310 is configured to recover the PCell of the radio link according to the PCell of the radio link; and according to the SCell of the radio link and the state information of each SCell, recover each SCell of the radio link to a state before the radio link failure or the handover failure, or recover each SCell of the radio link to a predetermined state, or recover a SCell of the radio link that is in an activated state.

The radio link configuration information further includes at least one piece of the following information: configuration information of a physical layer, configuration information of a media access control (MAC) layer, configuration information of a radio link control (RLC) layer, configuration information of a packet data convergence protocol (PDCP) layer, or configuration information of a service data adaptation protocol (SDAP) layer.

The processor 310 is configured to: in a case that a current cell to which a current location belongs is a cell in a predetermined cell set, perform the step of recovering the radio link where the radio link failure or the handover failure occurs, according to the radio link configuration information before the radio link failure or the handover failure; or otherwise, recover the radio link where the radio link failure or the handover failure occurs to a single carrier configuration.

The processor 310 is configured to:

receive system information broadcasted by a current cell to which a current location belongs;

detect, according to the system information, whether a configuration of the current cell is consistent with at least part of configurations supported by a serving cell to which a terminal before the radio link failure or the handover failure belongs;

when it is detected that the configuration of the current cell is consistent with part of the configurations supported by the serving cell to which the terminal before the radio link failure or the handover failure belongs, recover the radio link where the radio link failure or the handover failure occurs, according to the consistent part of the configurations in the radio link configuration information; or when it is detected that the configuration of the current cell is consistent with all the configurations supported by the serving cell to which the terminal before the radio link failure or the handover failure belongs, recover the radio link where the radio link failure or the handover failure occurs, according to all the configurations in the radio link configuration information.

According to the embodiments of the present disclosure, the terminal uses radio link configuration information before the RLF or HOF occurs to perform configurations for link recovery, when recovering a radio link to which RLF or HOF occurs, and does not need to perform a reconfiguration procedure after the link recovery, which simplifies configuration procedures of the radio link recovery, and shortens the recovery delay, thereby achieving the fast recovery of the radio link after RLF or HOF occurs.

It should be understood that, in the embodiments of the present disclosure, the radio frequency unit 31 may be configured to receive and send information, or to receive and send signals in a call. Specifically, the radio frequency unit 31 delivers the downlink information received from a base station to the processor 310 for processing. Generally, the radio frequency unit 31 includes, but not limited to, an antenna, at least one amplifier, a transceiver, a coupler, a low noise amplifier, a duplexer, or the like. In addition, the radio frequency unit 31 may also communicate with a network or other devices via a wireless communication system.

The terminal provides users with wireless broadband Internet access via the network module 32, such as helping users send and receive emails, browse web pages and access streaming media.

The audio output unit 33 may convert audio data received by the radio frequency unit 31 or the network module 32 or stored in the memory 39 into audio signals and output them as sound. Moreover, the audio output unit 33 may provide audio output (for example, call signal reception sound, message reception sound, etc.) related to a specific function performed by the terminal 30. The audio output unit 33 includes a speaker, a buzzer, a receiver, or the like.

The input unit 34 is configured to receive audio or video signals. The input unit 34 may include a graphics processing unit (GPU) 341 and a microphone 342. The graphics processor 341 is configured to process image data of still pictures or videos obtained via an image capture device (such as a camera) in an image capture mode or a video capture mode. The processed image frames may be displayed on the display unit 36. The image frames processed by the graphics processor 341 may be stored in the memory 39 (or other storage medium) or transmitted via the radio frequency unit 31 or the network module 32. The microphone 342 may receive sound, and may process the sound into audio data. The processed audio data may be converted into a format that can be transmitted to a mobile communication base station for outputting via the radio frequency unit 31 in the case of a telephone call mode.

The terminal 30 further includes at least one sensor 35, such as an optical sensor, a motion sensor, or other sensors. Specifically, the optical sensor includes an ambient light sensor and a proximity sensor. The ambient light sensor may adjust brightness of the display panel 361 according to the brightness of the ambient light, and the proximity sensor may close the display panel 361 and/or backlight when the terminal 30 approaches to the ear. As a type of motion sensor, an accelerometer sensor may detect the magnitude of acceleration in various directions (usually three-axis directions), and detect the magnitude and direction of gravity when in the stationary state. The accelerometer sensor may be applied to identify the pose of the terminal (such as switching of horizontal and vertical screen, a correlated game, magnetometer pose calibration), a function about vibration recognition (such as pedometer, tapping). The sensor 35 may also include a fingerprint sensor, a pressure sensor, an iris sensor, a molecular sensor, a gyroscope, a barometer, a hygrometer, a thermometer, an infrared sensors, or the like, which are not described herein.

The display unit 36 is configured to display information input by the user or information provided for the user. The display unit 36 may include a display panel 361. The display panel 361 may be configured in the form of a liquid crystal display (LCD), an organic light-emitting diode (OLED), or the like.

The user input unit 37 may be configured to receive inputted numeric or character information, and generate key signal inputs related to user settings and function control of the terminal. Specifically, the user input unit 37 includes a touch panel 371 and other input device 372. The touch panel 371, also known as a touch screen, may collect a touch operation of a user thereon or thereby (for example, an operation on or around the touch panel 371 that is made by a user with a finger, a touch pen or any other suitable object or accessory). The touch panel 371 may include two parts: a touch detection device and a touch controller. The touch detection device detects touch orientation of the user, detects a signal caused by the touch operation, and transmits the signal to the touch controller. The touch controller receives touch information from the touch detection device, converts the touch information into contact coordinates, and transmits the contact coordinates to the processor 310. The touch controller may receive a command from by the processor 310 and executes the command In addition, the touch panel 371 may be implemented by various types such as a resistive panel, a capacitive panel, an infrared panel, or a surface acoustic wave panel. In addition to the touch panel 371, the user input unit 37 may include other input device 372.

Specifically, the other input device 372 may include, but is not limited to, a physical keyboard, a function key (such as a volume control key, a switch key), a trackball, a mouse, or a joystick, which are not described herein.

Further, the display panel 361 may be covered by the touch panel 371. When the touch panel 371 detects a touch operation on or near the touch panel 371, the touch panel 371 transmits the touch operation to the processor 310 to determine the type of the touch event, and the processor 310 provides a corresponding visual output on the display panel 361 according to the type of touch event. Although the touch panel 371 and the display panel 361 are implemented as two independent components to implement the input and output functions of the terminal in FIG. 3, in some embodiments, the touch panel 371 and the display panel 361 may be integrated to implement the input and output functions of the terminal, which are not limited herein.

The interface unit 38 is an interface through which an external device is connected to the terminal 30. For example, the external device may include a wired or wireless headset port, an external power (or battery charger) port, a wired or wireless data port, a memory card port, a port for connecting a device with an identity module, an audio input/output (I/O) port, a video I/O port, a headphone port, etc. The interface unit 38 may be configured to receive input (e.g., data information, power, etc.) from an external device and transmit the received input to one or more elements in the terminal 30 or may be configured to transmit data between the terminal 30 and the external device.

The memory 39 may be configured to store software programs and various data. The memory 39 may mainly include a program storage area and a data storage area, where the program storage area may store an operating system, an application program (such as a sound playback function, an image playback function, etc.) required for at least one function; the data storage area may store data (such as audio data, a phone book, etc.) created according to the use of the mobile phone. In addition, the memory 39 may include a high-speed random access memory, and may further include a non-volatile memory, such as at least one magnetic disk storage device, a flash memory device, or other volatile solid-state storage device.

The processor 310 is a control center of the terminal, which uses various interfaces and lines to connect various parts of the entire terminal. The processor 310 runs or executes software programs and/or modules stored in the memory 39 and calls data stored in the memory 39, to execute various functions of the terminal and process data, so as to monitor the terminal as a whole. The processor 310 may include one or more processing units. Optionally, the processor 310 may integrate an application processor and a modem processor. The application processor mainly processes an operating system, a user interface, an application program, etc., and the modem processor mainly processes wireless communications. It can be understood that the foregoing modem processor may not be integrated into the processor 310.

The terminal 30 may further include a power supply 1211 (such as a battery) for supplying power to various components. Optionally, the power supply 1211 may be logically connected to the processor 310 through a power management system, so as to implement functions, such as management of charging and discharging, and power consumption management, via the power management system.

In addition, the terminal 30 may include some functional modules that are not shown, which are not described herein again.

Optionally, embodiments of the present disclosure further provide a terminal, including a processor 310, a memory 39, and a computer program stored on the memory 39 and executable by the processor 310. When the computer program is executed by the processor 310, various processes of embodiments about the radio link recovery method are implemented, which can achieve the same technical effects. To avoid repetition, details are not described herein. The terminal may be a wireless terminal or a wired terminal. The wireless terminal may be a device that provides voice and/or other service data connectivity to a user, a handheld device with a wireless connection function, or other processing devices connected to a wireless modem. A wireless terminal may communicate with one or more core networks via a radio access network (RAN for short). The wireless terminal may be a mobile terminal, such as a mobile phone (or referred to as "cellular" phone) and a computer including a mobile terminal, which may be, for example, a portable, pocket-sized, hand-held, computer built-in or vehicle-mounted mobile device, and exchanges language and/or data with a wireless access network. For example, the terminal may be a personal communication service (PCS) phone, a cordless phone, a session initiation protocol (SIP) phone, a wireless local loop (WLL) station, and a personal digital assistant (PDA) and other devices. The wireless terminal may also be referred to as a system, a subscriber unit, a subscriber station, a mobile station, a remote station, a remote terminal, an access terminal, a user terminal, a user agent, a user device or user equipment, which are not limited herein.

Embodiments of the present disclosure further provide a computer readable storage medium. A computer program is stored on the computer readable storage medium. When the computer program is executed by a processor, various processes of the embodiments about the radio link recovery method are implemented, which can achieve the same technical effects. To avoid repetition, details are not described herein. The computer readable storage medium is, for example, a read-only memory (ROM), a random access memory (RAM), a magnetic disk or an optical disk.

Those of ordinary skill in the art may appreciate that the units and algorithm steps of the various examples described in conjunction with the embodiments of the present disclosure can be implemented by electronic hardware or a combination of computer software and electronic hardware. Whether these functions are performed in hardware or software depends on the specific application and design constraints of the technical solutions. Those of ordinary skill in the art can use different methods to implement the described functions for each particular application, but such implementations should not be considered as going beyond the scope of the present disclosure.

Those of ordinary skill in the art can clearly understand that for convenience and clarification, operation processes of the systems, devices and units described hereinabove may refer to the corresponding processes in the above-mentioned method embodiments, and thus will not be particularly defined herein.

It should be understood that in the embodiments of the present application, the disclosed apparatus and method may be implemented in other manners. For example, the apparatus embodiments described above are merely illustrative. For example, the division of the units is only a logical function division, and in practical implementations, there may be another manner of division. For example, multiple units or components may be combined or integrated into another system, or some features can be ignored or not implemented. In addition, the mutual coupling or direct coupling or communication connection shown or discussed may be implemented with some interfaces, and indirect coupling or communication connection between apparatuses or units may be electrical, mechanical or in other forms.

The units described as separate components may or may not be physically separated, and the components shown as units may or may not be physical units, that is, they may be located in one place or distributed to multiple network units. Some or all of the units may be selected according to practical needs to achieve the objective of the technical solutions of the embodiments.

In addition, functional units in various embodiments of the present disclosure may be integrated into one processing unit, or each unit may exist physically separately, or two or more units may be integrated into one unit.

In a case that the functions are implemented in the form of a software functional unit which is sold or used as a standalone product, the product may be stored in a computer-readable storage medium. Based on such understanding, the essence or the portion of the technical solutions of the present disclosure that contributes to the prior art may be embodied in the form of a software product. The computer software product is stored in a storage medium, which includes instructions that cause a computer device (which may be a personal computer, a server or a network device) to perform all or part of the steps of the methods according to the embodiments of the present disclosure. The foregoing storage medium may include any storage medium that can store program codes, such as a USB flash drive, a mobile hard disk, a ROM, a RAM, a magnetic disk, or an optical disk.

In addition, it should be noted that, in the device and method of the present disclosure, obviously, various components or various steps can be decomposed and/or recombined. These decompositions and/or recombinations should be regarded as equivalent solutions of the present disclosure. In addition, steps for performing the above-mentioned series of processing may be naturally executed in chronological order as described, but do not necessarily need to be executed in chronological order, and some steps may be executed in parallel or independently of each other. Those of ordinary skill in the art can understand that all or any of steps of the method or components of devices of the present disclosure can be implemented by hardware, firmware, software, or any combination thereof in any computing device (including a processor, a storage medium, etc.) or in a network of a computing device, which can be achieved by those of ordinary skill in the art using their basic programming skills after reading the description of the present disclosure.

Therefore, the purposes of the present disclosure can also be achieved by running a program or a group of programs on any computing device. The computing device may be a well-known and general-purpose device. Therefore, the objective of the present disclosure can also be achieved only by providing a program product including program codes for implementing the method or device. That is, such a program product also constitutes the present disclosure, and a storage medium storing such a program product also constitutes the present disclosure. Obviously, the storage medium may be any known storage medium or any storage medium to be developed in the future. It should also be noted that, in the device and method of the present disclosure, obviously, various components or various steps can be decomposed and/or recombined. These decompositions and/or recombinations should be regarded as equivalent solutions of the present disclosure. In addition, steps for performing the above-mentioned series of processing may be naturally executed in chronological order as described, but do not necessarily need to be executed in chronological order. Some steps may be executed in parallel or independently of each other.

The above embodiments are optional embodiments of the present disclosure. It should be noted that those of ordinary skill in the art can also make several improvements and modifications without departing from principles of the present disclosure, and these improvements and modifications shall also fall within the protection scope of the present disclosure.

What is claimed is:

1. A radio link recovery method, comprising:
receiving system information broadcasted by a current cell to which a current location of a terminal belongs;
determining first configurations supported by the current cell and second configurations supported by a serving cell to which the terminal belongs before a radio link failure or a handover failure occurs, according to the system information and radio link configuration information before the radio link failure or the handover failure occurs, wherein the radio link configuration information is stored in the terminal and comprises at least one piece of following information: configuration information of carrier aggregation (CA), configuration information of dual connectivity (DC), or configuration information of bandwidth part (BWP), and the current cell is different from the serving cell to which the terminal belongs before the radio link failure or the handover failure occurs;
in accordance with a determination that the first configurations are consistent with a part of the second configurations, recovering the radio link where the radio link failure or the handover failure occurs through the current cell, according to the consistent part of the second configurations indicated by the radio link configuration information, such that the recovered radio link at least has the consistent part of the second configurations.

2. The radio link recovery method according to claim 1, wherein before recovering the radio link where the radio link failure or the handover failure occurs, the method further comprises:
obtaining access stratum (AS) context information before the radio link failure or the handover failure occurs, when the radio link failure or the handover failure occurs; and
determining, according to the AS context information, the radio link configuration information.

3. The radio link recovery method according to claim 1, wherein the radio link configuration information further comprises at least one piece of following information:
configuration information of a physical layer, configuration information of a media access control (MAC) layer, configuration information of a radio link control (RLC) layer, configuration information of a packet data convergence protocol (PDCP) layer, or configuration information of a service data adaptation protocol (SDAP) layer.

4. The radio link recovery method according to claim 3, wherein in the recovered radio link, only configurations indicated by the configuration information of the RLC layer, the configuration information of the PDCP layer, or the configuration information of the SDAP layer is recovered, and configurations associated with the configuration information of the physical layer and the configuration information of the MAC layer are set as default configurations.

5. The radio link recovery method according to claim 4, wherein in the recovered radio link, a serial number of the PDCP layer is reset to zero, and a configuration relating to a header compression state algorithm of the PDCP layer is recovered with the configuration information of the PDCP layer.

6. The radio link recovery method according to claim 1, wherein the radio link configuration information comprises configuration information of a primary cell (PCell) in the CA or the DC, and configuration information of a plurality of secondary cells (SCells) in the CA or the DC, the configuration information of the plurality of SCells comprises the quantity of the plurality of SCells, and state information of each SCell in the plurality of SCells, wherein the state information comprises one of an activated state, a deactivated state or a new state, and in the new state, a periodic channel quality indicator (CQI) reporting is allowed to be performed based on a cell reference signal (CRS) without physical downlink control channel (PDCCH) monitoring;
wherein the recovering the radio link where the radio link failure or the handover failure occurs comprises:
recovering the radio link where the radio link failure or the handover failure occurs through the current cell, such that the quantity of recovered SCells included in the recovered radio link is the same as the quantity of the plurality of SCells indicated by the radio link configuration information before the radio link failure or the handover failure occurs, and a state of each of the recovered SCells is the same as a state of a corresponding one of the plurality of SCells indicated by the state information.

7. The radio link recovery method according to claim 1, wherein the radio link configuration information comprises configuration information of a primary cell (PCell) in the CA or the DC, and configuration information of a plurality of secondary cells (SCells) in the CA or the DC, the configuration information of the plurality of SCells comprises the quantity of the plurality of SCells, and state information of each SCell in the plurality of SCells, wherein the state information comprises one of an activated state, a deactivated state or a new state, and in the new state, a periodic channel quality indicator (CQI) reporting is allowed to be performed based on a cell reference signal (CRS) without physical downlink control channel (PDCCH) monitoring;
wherein the recovering the radio link where the radio link failure or the handover failure occurs comprises:
recovering the radio link where the radio link failure or the handover failure occurs through the current cell, such that a state of each of recovered SCells included in the recovered radio link is the activated state, and the quantity of the recovered SCells is the same as the quantity of SCells in the in the plurality of SCells having the activated state.

8. The radio link recovery method according to claim 1, wherein the radio link configuration information comprises configuration information of a primary cell (PCell) in the CA or the DC, and configuration information of a plurality of secondary cells (SCells) in the CA or the DC, the configuration information of the plurality of SCells comprises the quantity of the plurality of SCells, and state information of each SCell in the plurality of SCells, wherein the state information comprises one of an activated state, a deactivated state or a new state, and in the new state, a periodic channel quality indicator (CQI) reporting is allowed to be performed based on a cell reference signal (CRS) without physical downlink control channel (PDCCH) monitoring;
wherein the recovering the radio link where the radio link failure or the handover failure occurs comprises:
recovering the radio link where the radio link failure or the handover failure occurs through the current cell, such that the quantity of recovered SCells included in the recovered radio link is the same as the quantity of the plurality of SCells indicated by the radio link configuration information before the radio link failure or the handover failure occurs, and a state of each of the recovered SCells is a predetermined state selected from the activated state, the deactivated state or the new state.

9. A terminal, comprising a processor, a memory, and a computer program that is stored on the memory and executable on the processor, wherein the processor is configured to:
receive system information broadcasted by a current cell to which a current location of a terminal belongs;
determine first configurations supported by the current cell and second configurations supported by a serving cell to which the terminal belongs before a radio link failure or a handover failure occurs, according to the system information and radio link configuration information before the radio link failure or the handover failure occurs, wherein the radio link configuration information is stored in the terminal and comprises at least one piece of following information: configuration information of carrier aggregation (CA), configuration information of dual connectivity (DC), or configuration information of bandwidth part (BWP), and the current cell is different from the serving cell to which the terminal belongs before the radio link failure or the handover failure occurs;
in accordance with a determination that the first configurations are consistent with a part of the second configurations, recover the radio link where the radio link failure or the handover failure occurs through the current cell, according to the consistent part of the second configurations indicated by the radio link configuration information, such that the recovered radio link at least has the consistent part of the second configurations.

10. The terminal according to claim 9, wherein the processor is further configured to:
obtain access stratum (AS) context information before the radio link failure or the handover failure occurs, when the radio link failure or the handover failure occurs; and
determine, according to the AS context information, the radio link configuration information.

11. The terminal according to claim 9, wherein the radio link configuration information further comprises at least one piece of following information:
configuration information of a physical layer, configuration information of a media access control (MAC) layer, configuration information of a radio link control (RLC) layer, configuration information of a packet data convergence protocol (PDCP) layer, or configuration information of a service data adaptation protocol (SDAP) layer.

12. The terminal according to claim 9, wherein the radio link configuration information comprises configuration information of a primary cell (PCell) in the CA or the DC, and configuration information of a plurality of secondary cells (SCells) in the CA or the DC, the configuration information of the plurality of SCells comprises the quantity of the plurality of SCells, and state information of each SCell in the plurality of SCells, wherein the state information comprises one of an activated state, a deactivated state or a new state, and in the new state, a periodic channel quality indicator (CQI) reporting is allowed to be performed based on a cell reference signal (CRS) without physical downlink control channel (PDCCH) monitoring;

wherein the processor is further configured to:
recover the radio link where the radio link failure or the handover failure occurs through the current cell, such that the quantity of recovered SCells included in the recovered radio link is the same as the quantity of the plurality of SCells indicated by the radio link configuration information before the radio link failure or the handover failure occurs, and a state of each of the recovered SCells is the same as a state of a corresponding one of the plurality of SCells indicated by the state information.

13. The terminal according to claim 9, wherein the radio link configuration information comprises configuration information of a primary cell (PCell) in the CA or the DC, and configuration information of a plurality of secondary cells (SCells) in the CA or the DC, the configuration information of the plurality of SCells comprises the quantity of the plurality of SCells, and state information of each SCell in the plurality of SCells, wherein the state information comprises one of an activated state, a deactivated state or a new state, and in the new state, a periodic channel quality indicator (CQI) reporting is allowed to be performed based on a cell reference signal (CRS) without physical downlink control channel (PDCCH) monitoring;

wherein the processor is further configured to:
recover the radio link where the radio link failure or the handover failure occurs through the current cell, such that a state of each of recovered SCells included in the recovered radio link having the activated state, and the quantity of the recovered SCells is the same as the quantity of SCells in the in the plurality of SCells having the activated state.

14. The terminal according to claim 9, wherein the radio link configuration information comprises configuration information of a primary cell (PCell) in the CA or the DC, and configuration information of a plurality of secondary cells (SCells) in the CA or the DC, the configuration information of the plurality of SCells comprises the quantity of the plurality of SCells, and state information of each SCell in the plurality of SCells, wherein the state information comprises one of an activated state, a deactivated state or a new state, and in the new state, a periodic channel quality indicator (CQI) reporting is allowed to be performed based on a cell reference signal (CRS) without physical downlink control channel (PDCCH) monitoring;

wherein the processor is further configured to:
recover the radio link where the radio link failure or the handover failure occurs through the current cell, such that the quantity of recovered SCells included in the recovered radio link is the same as the quantity of the plurality of SCells indicated by the radio link configuration information before the radio link failure or the handover failure occurs, and a state of each of the recovered SCells is a predetermined state selected from the activated state, the deactivated state or the new state.

15. A non-transitory computer-readable storage medium, wherein the computer-readable storage medium stores a program, and the program is executed by a processor to implement steps:

receiving system information broadcasted by a current cell to which a current location of a terminal belongs;

determining first configurations supported by the current cell and second configurations supported by a serving cell to which the terminal belongs before a radio link failure or a handover failure occurs, according to the system information and radio link configuration information before the radio link failure or the handover failure occurs, wherein the radio link configuration information is stored in the terminal and comprises at least one piece of following information: configuration information of carrier aggregation (CA), configuration information of dual connectivity (DC), or configuration information of bandwidth part (BWP), and the current cell is different from the serving cell to which the terminal belongs before the radio link failure or the handover failure occurs;

in accordance with a determination that the first configurations are consistent with a part of the second configurations, recovering the radio link where the radio link failure or the handover failure occurs through the current cell, according to the consistent part of the second configurations indicated by the radio link configuration information, such that the recovered radio link at least has the consistent part of the second configurations.

16. The non-transitory computer-readable storage medium according to claim 15, wherein the program is executed by the processor to implement steps:

obtaining access stratum (AS) context information before the radio link failure or the handover failure occurs, when the radio link failure or the handover failure occurs; and determining, according to the AS context information, the radio link configuration information.

17. The non-transitory computer-readable storage medium according to claim 15, wherein the radio link configuration information comprises configuration information of a primary cell (PCell) in the CA or the DC, and configuration information of a plurality of secondary cells (SCells) in the CA or the DC, the configuration information of the plurality of SCells comprises the quantity of the plurality of SCells, and state information of each SCell in the plurality of SCells, wherein the state information comprises one of an activated state, a deactivated state or a new state, and in the new state, a periodic channel quality indicator (CQI) reporting is allowed to be performed based on a cell reference signal (CRS) without physical downlink control channel (PDCCH) monitoring;

wherein the program is executed by the processor to implement steps:

recovering the radio link where the radio link failure or the handover failure occurs through the current cell, such that the quantity of recovered SCells included in the recovered radio link is the same as the quantity of the plurality of SCells indicated by the radio link configuration information before the radio link failure or the handover failure occurs, and a state of each of the recovered SCells is the same as a state of a corresponding one of the plurality of SCells indicated by the state information.

18. The non-transitory computer-readable storage medium according to claim 15, wherein the radio link configuration information comprises configuration information of a primary cell (PCell) in the CA or the DC, and configuration information of a plurality of secondary cells (SCells) in the CA or the DC, the configuration information of the plurality of SCells comprises the quantity of the plurality of SCells, and state information of each SCell in the plurality of SCells, wherein the state information comprises one of an activated state, a deactivated state or a new state, and in the new state, a periodic channel quality indicator (CQI) reporting is allowed to be performed based on a cell reference signal (CRS) without physical downlink control channel (PDCCH) monitoring;

wherein the program is executed by the processor to implement steps:

recovering the radio link where the radio link failure or the handover failure occurs through the current cell, such that a state of each of recovered SCells included in the recovered radio link having the activated state, and the quantity of the recovered SCells is the same as the quantity of SCells in the in the plurality of SCells having the activated state.

19. The non-transitory computer-readable storage medium according to claim 15, wherein the radio link configuration information comprises configuration information of a primary cell (PCell) in the CA or the DC, and configuration information of a plurality of secondary cells (SCells) in the CA or the DC, the configuration information of the plurality of SCells comprises the quantity of the plurality of SCells, and state information of each SCell in the plurality of SCells, wherein the state information comprises one of an activated state, a deactivated state or a new state, and in the new state, a periodic channel quality indicator (CQI) reporting is allowed to be performed based on a cell reference signal (CRS) without physical downlink control channel (PDCCH) monitoring;

wherein the program is executed by the processor to implement steps:

recovering the radio link where the radio link failure or the handover failure occurs through the current cell, such that the quantity of recovered SCells included in the recovered radio link is the same as the quantity of the plurality of SCells indicated by the radio link configuration information before the radio link failure or the handover failure occurs, and a state of each of the recovered SCells is a predetermined state selected from the activated state, the deactivated state or the new state.

\* \* \* \* \*